United States Patent [19]

Pinson

[11] Patent Number: 4,792,870

[45] Date of Patent: Dec. 20, 1988

[54] METHOD AND APPARATUS FOR TRACK ACCESSING USING A PREDICTED STATE VECTOR

[75] Inventor: Denis Pinson, Thoiry, France

[73] Assignee: Bull S.A., Paris, France

[21] Appl. No.: 13,585

[22] Filed: Feb. 11, 1987

[30] Foreign Application Priority Data

Feb. 14, 1986 [FR] France .................. 86 02022

[51] Int. Cl.$^4$ .............. G11B 21/08; G11B 5/55; G11B 13/02
[52] U.S. Cl. .................. 360/78.14; 364/165; 364/178; 318/561
[58] Field of Search .............. 360/77, 78; 318/561, 318/571, 636, 449, 450, 568, 594, 615–618; 364/178, 164, 165; 369/32, 33, 41

[56] References Cited

U.S. PATENT DOCUMENTS

| | | | |
|---|---|---|---|
| 4,031,443 | 6/1977 | Droux et al. | 318/561 |
| 4,133,011 | 1/1979 | Kurzweil, Jr. | 360/78 |
| 4,166,970 | 9/1979 | Cardot et al. | 318/561 |
| 4,297,734 | 10/1981 | Laishley et al. | 360/78 |
| 4,383,207 | 5/1983 | Maury | 318/561 |
| 4,491,776 | 1/1985 | Veale | 318/561 |

FOREIGN PATENT DOCUMENTS

2060941  5/1981  United Kingdom .

OTHER PUBLICATIONS

IBM TDB vol. 19, No. 12 "Algorithm For Track Capture and Following on Disk Files" Craft, 5/77, pp. 4787–4789.

IBM TDB vol. 21, No. 5, "Offset Force Correction For Disk File" Mantey, 10/78, pp. 1792–1795.

IEEE Transactions on Magnetics, vol. MAG-17, No. 4 Jul. 1981, pp. 1396–1402 New York, U.S.; C. Maury: "High Track Density for Magnetic Disk Drives with an Embedded Servo Positioning System".

IBM Technical Disclosure Bulletin, vol. 9 No. 5, Oct. 1976, p. 1884 J. W. Reed: "Access-Control System with Reduced Velocity Error".

Primary Examiner—Raymond F. Cardillo
Assistant Examiner—Steven R. Garland
Attorney, Agent, or Firm—Kerkam, Stowell, Kondracki & Clarke

[57] ABSTRACT

A method and apparatus for displacing a system that is movable with respect to a carrier of data recorded on a plurality of tracks, including a reading head (TEL$_1$), which is displaced on a given path the position on which is measured at predetermined sampling instants (kT), characterized in that: (1) at each instant kT, the value of the state vector $\hat{X}$ k/k−1 is predicted, as a function of the measured position $x_m(k-1)$ and of the control voltage $u(k-1)$, which are considered at the preceding sampling instant (k−1)T; (2) the predicted state vector is compared with a reference state vector $\underline{W}(k)$; and (3) the control voltage $u(k)$ is calculated as a function of a reference control voltage $e(k)$ at the instant kT and of the difference $\underline{\epsilon}(k)$ between the predicted state vector and the reference state vector.

6 Claims, 7 Drawing Sheets

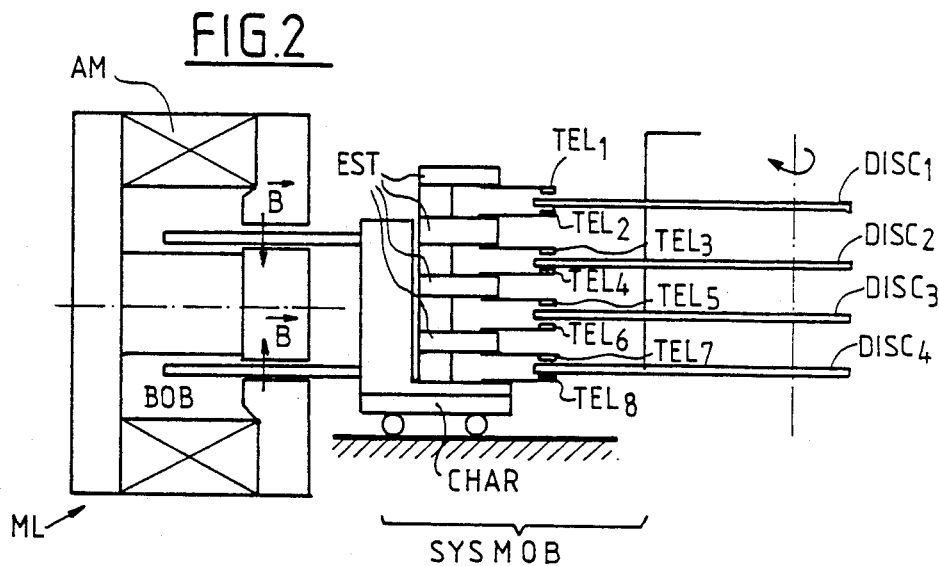
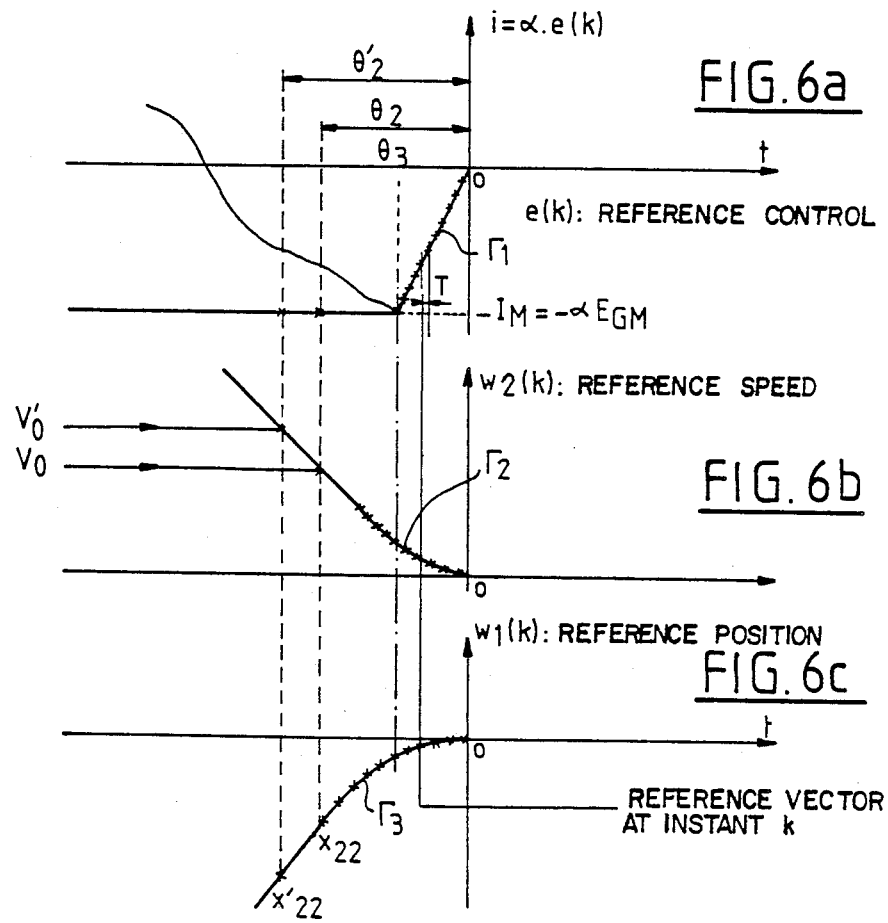

METHOD AND APPARATUS FOR TRACK ACCESSING USING A PREDICTED STATE VECTOR

FIELD OF THE INVENTION

The present invention relates to a method for displacing a system that is movable with respect to a data carrier, and to the apparatus for performing the method. More particularly, it is applicable to the displacement of reading/writing heads of disk memories used in data processing systems.

BACKGROUND OF THE INVENTION

A magnetic disk memory is distinguished by its large storage capacity and by the relatively short time taken by the magnetic heads, which read and write the data contained on the disks, to access any information contained at any point on the disks, beginning at the moment when they have received the command to access this information. This time as defined above is known as the access time.

The data on the magnetic disks are recorded in binary encoded form on concentric circular recording tracks, the width of which does not exceed a few tens of microns and which are disposed on both sides of the disks.

Associated with each side of a magnetic disk is at least one magnetic reading/writing head disposed a few tenths of a micron away from this side.

In current practice, and more particularly in the case of memories that include a limited number of disks (generally less than four or five), the data contained on each side of a disk are preferably distributed over equal and adjacent sectors of a circle. Conventionally, one side of a disk is divided into several tens of sectors (most often, 40 to 50). This kind of distribution of data on magnetic disks is described in French Pat. No. 2.466,078, for example, filed by the Compagnie Internationale, pour l'Informatique Cii Honeywell Bull, predecessor in interest to Bull, S. A., assignee of the present invention, on Sept. 21, 1979, corresponding to U.S. Pat. No. 4,383,207.

Each sector is divided into two unequal areas. The larger area includes the data that are intended to be processed by the data processing system of which the disk memory is a part (these are called data to be processed), while the smaller area includes the data required for automatic control of the position above the tracks of the magnetic head associated with the side of the disk containing these data. The track position finding data include in particular the addresses of the tracks. It will be recalled that the address of a track is the encoded expression of the serial number j of a track affected thereby, j being an integer varying from 0 to $NP-1$, NP being the total number of recording tracks. When the magnetic reading head associated with one side of a disk is located facing a predetermined sector thereof and reads a given address, this means that it is located facing the track having the serial number j corresponding to this address. The address accordingly represents the position occupied by the head facing the side of the disk.

Since the disk has a constant speed of rotation, the time taken by the disk for two successive sectors of the disk to travel past the reading head is identical from one sector to the other. This time T separating the passage of two successive sectors before the reading head is called the "sampling period".

The position occupied by the head (that is, the address read by the head) is thus known every T seconds, and the corresponding instants are called "sampling instants".

The present trend in the development of disk memories is to attempt to shorten the access time. To do this, the head must be capable of displacement from a departure track to the arrival track within the shortest possible time and must be capable of being positioned precisely with respect to the arrival track.

Apparatuses which enable displacing and positioning the head in response to these requirements are also known. These apparatuses utilize an electrodynamic motor of the "voice coil" type, which includes a coil that is displaced linearly on the inside of a permanent magnet. This coil is mechanically connected to a carriage, which via a suspension arm carries the magnetic heads associated with each of the sides of the disks in the disk memory.

A movement comprising two phases, one of acceleration and the other of deceleration, is imposed on a displacement and positioning apparatus of this kind. In the course of the first phase, a direct current having a predetermined direction is applied to the coil. Generally, this first phase is done in an open loop (that is, the head positioning system is not slaved) and with a constant acceleration.

In the course of the second phase, the movement of the head is generally under automaic control, that is, slaved, and the current direction is opposite that of the first phase.

Various means for slaving the movement of the head during this second phase are known. Such means are described, respectively, in French Pat. No. 2,336,768, corresponding to U.S. Pat. No. 4,166,970, filed on Dec. 24, 1975, and No. 2,258,661, corresponding to U.S. Pat. No. 4,031,443, filed on Jan. 18, 1974, as well as the aforementioned No. 2,466,078, all these patents having been filed by the Compagnie Internationale pour l'Informatique Cii Honeywell Bull.

French Pat. No. 2.336.768 describes an apparatus for displacing a system that is movable with respect to a magnetic disk in which the current in the coil is a function of the comparison between the position occupied by the head and the position of the arrival track. The movement of the head is thus slaved to the position occupied by the head.

French Pat. No. 2.258.661 describes a system for displacing a system that is movable with respect to a magnetic disk in which the current in the coil during the second phase is a function of the comparison between a theoretical reference speed furnished by a memory and an actual measured speed of the head positioning system.

French Pat. No. 2.466.078 describes a positioning system with slaved acceleration. The current in the motor, at the time of the deceleration phase, is a function of the comparison between a set-point acceleration (which can also be called a reference acceleration) and the measured acceleration of the head positioning system.

If the positioning system described in principle do enable obtaining correct access time and precision, still they no longer meet current requirements in terms of material.

Furthermore, for a given energy supplied to the positioning system, the access time of the systems described above is considered to be overly long. Similarly, for a given access time, the energy expended by these positioning systems is considered to be excessive.

OBJECT AND SUMMARY OF THE INVENTION

The present invention makes it possible to overcome these disadvantages, by substantially reducing the energy expended for a given access time, or substantially shortening the access time for a given amount of energy. On the other hand, the performance obtained (access time, precision) is relatively constant from one disk memory of a given type to another disk memory of the same type.

The invention comprises automatic control, or slaving, of the magnetic head displacement apparatus via the state vector that simultaneously indicates both the position and speed of the head, at each sampling instant, by comparison between a state vector the value of which is predicted for each sampling instant and a reference state vector for the same instant.

According to the invention, the method for displacing a system that is movable with respect to a carrier of data recorded on a plurality of tracks, the system being moved by an electric motor supplied with voltage/current by a supply generator controlled in turn by a control voltage and including at least one data reading/writing head displaced on a give path of a track, from a departure track to an arrival track, the position of the head on the path being measured at predetermined sampling instants by a position pickup, is characterized in that (1) at each predetermined sampling instant, the value of the state vector indicating the position and speed of the head at that instant is predicted, as a function of the position of the head measured by the position pickup and of the control voltage, which are considered at the preceding sampling instant;

(2) the predicted state vector is compared with a reference state vector indicating the reference position and speed which the head must have at the predetermined sampling instant; and (3) the control voltage is calculated as a function of a reference control voltage of the motor at the predetermined sampling instant and of the difference between the predicted state vector and the reference state vector.

In a preferred feature of the method according to the invention, the estimation of the state vector takes into account measurement noise in the variables observed (position, error in control voltage) and noise affecting the state vector.

The invention also relates to an apparatus for performing the method described above, and is characterized in that it includes:

state observation means for predicting the value of the state vector at each sampling instant, which receive both the value of the head position measured by the position pickup at the preceding sampling instant and the value of the control voltage at this same instant;

means for memorizing the reference control voltage and the reference state vector for each sampling instant;

means for comparing the predicted state vector with the reference state vector and for calculating the difference between them; and means for correcting the control voltage, which receive the reference voltage and the difference between the predicted state vector and the reference state vector and calculate a correction voltage which is cut off from the reference control voltage.

Both the method and the apparatus according to the invention make it possible to obtain much shorter access times than the methods of the prior art, while requiring substantially less energy furnished to the positioning system.

Further characteristics and advantages of the present invention will become apparent from the ensuing description provided by way of non-limiting example, taken in conjunction with the drawings.

BRIEF DESCRIPTION OF THE DRAWINGS

FIG. 2 is a schematic sectional view showing the system that is movable with respect to a magnetic disk, which is to be displaced using the method according to the invention;

FIGS. 6A–C are series of three curves, respectively showing as a function of time the evolution of the current supplied to the reference motor, the reference speed, and the reference position, at the time of the final movement phase of the movable system, or in other words at the time of the deceleration phase;

FIGS. 7a and 7b, in which FIG. 7b is a detailed view of part of FIG. 7a, show how the position and speed of the system at which they shift to the deceleration phase are detected.

DESCRIPTION OF THE PREFERRED EMBODIMENTS

For better understanding of the structure and function of the apparatus for displacement of a system that is movable with respect to a recording medium such as a magnetic disk for performing the method according to the invention, it will be helpful to review some aspects illustrated in FIGS. 1a–1d and in FIG. 2, showing, first (FIGS. 1a–1d), how the data are distributed on a side of a magnetic disk and, second (FIG. 2), the structure of the movable system that is to be displaced.

Review of how data are distributed on a side of a disk

Referring to FIGS. 1a–1d, the disk DISC rotates in the direction of the arrow F. Its useful recording surface is defined by the circles d1 and d2. These two circles respectively define an inner recording track having the serial number 0 and an outer recording track having the serial number $NP-1$, where NP is the total number of tracks. On the disk DISC, p equal and adjacent circular sectors $S_0$, $S_1$, $S_i$, $S_{i+1}$, $S_p$ are defined. Thus, as is better seen in FIG. 1b, any sector $S_i$ includes two parts $SDO_i$, $SAD_i$, on which, respectively, the data to be processed and the track position-finding data, including the addresses of the tracks, are recorded. The surface of the part $SAD_i$ represents only a few percent of the surface area of the part $SDO_i$.

Figure 1A:
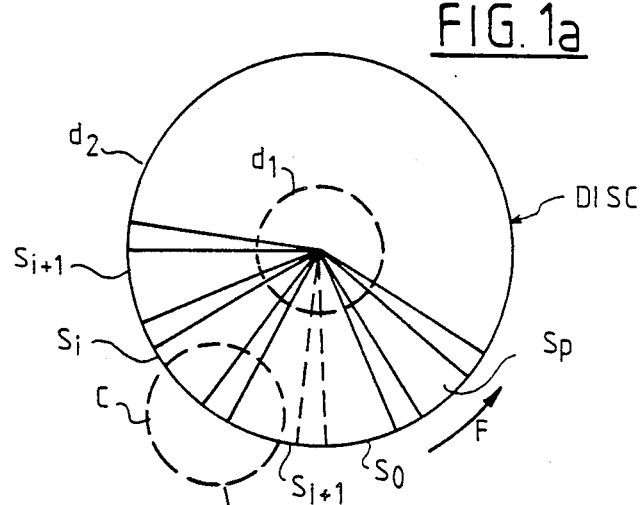
FIGS. 1a–1d show different views of preferred exemplary distribution of data on a side of a magnetic disk.
Figure 1B:
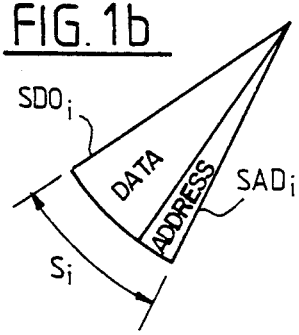
Figure 1C:
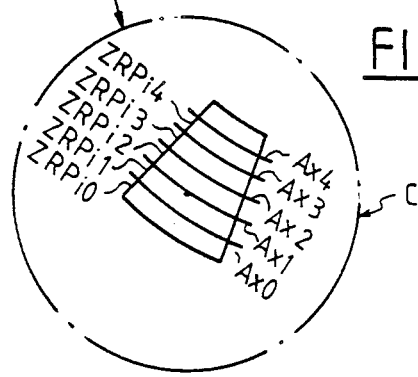
Figure 1D:
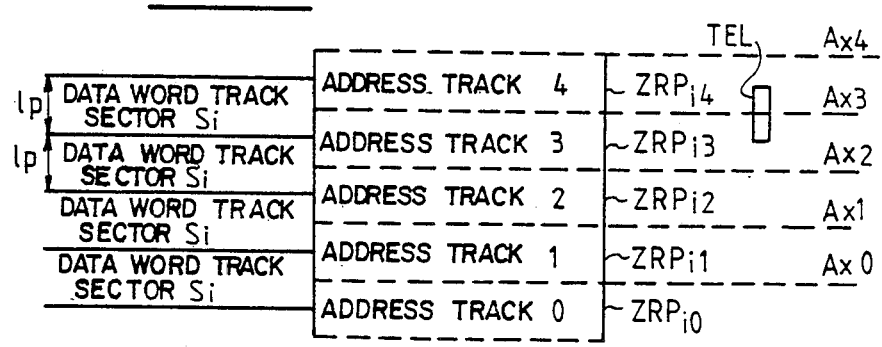

FIGS. 1c and 1d are a view on a larger scale of the part $SAD_i$ of the sector $S_i$ included on the inside of the circle C.

Each part $SAD_1$ of this sector is divided into NP reference zones, $ZRP_{i0}$, $ZRP_{i1}$, ..., $ZRP_{ij}$, ..., $ZRP_{ij(N-1)}$. For simplification, only the reference zones $ZRP_{i0}$ to $ZRP_{i4}$ are shown in FIGS. 1c and 1d, symbolized in FIG. 1d by rectangles.

The boundaries between the various reference zones $ZRP_{ij}$ coincide with the circles $Ax_j$ which define the middle of the recording tracks of the magnetic disk DISC. It will be seen that in each sector $S_i$ the reference zones $ZRP_{ij}$ and $ZRP_{i(j+1)}$ are associated with the track having the serial number i in the middle circle $Ax_j$. Thus the two reference zones $ZRP_{i0}$ and $ZRP_{i1}$ are associated with the track having the serial number 0, and the reference zones $ZRP_{i1}$, $ZRP_{i2}$ are associated with the track having the serial number i, and so forth.

Each reference zone $ZRP_{ij}$ includes, in particular, binary data representing the address of the track having the serial number j. Thus the reference zone $ZRP_{i0}$ includes binary data representing the address of the track 0; the reference zones $ZRP_{i1}$ includes the binary data representing the address of the track having the serial number 1, and so forth.

When the reading/writing head TEL associated with the side of the magnetic disk DISC is displaced from a departure track A to an arrival track B, it reads in each sector the address of the track above which it is located, doing so every T seconds, with T being as defined above. If V is the speed of rotation of the magnetic disk DISC expressed in revolutions per minute, and p is the total number of sectors, then the time T that elapses between the passage of two successive sectors facing the magnetic head TEL is $$T = 60/(V \times p).$$

Thus if the speed of rotation V is 3600 rpm and p, the number of sectors, equals 50, then T = 333.3 microseconds.

The reading signals of the head TEL corresponding to the binary data of the addresses read in the reference zones are sent to electronic forming circuits as described in French Pat. No. 2.466.078. The address read by the head TEL, formed by the associated reading circuits, represents the position occupied by the reading head facing the DISC, between the tracks A and B. This earlier patent shows that the precision with which the head position is determined as equal to one-half of a track.

Description of the movable system to be displaced

Turning to FIG. 2, a movable system SYSMOB is shown, which enables displacing reading/writing heads $TEL_1$-$TEL_8$ associated with the eight sides of four magnetic disks $DISC_1$-$DISC_4$. These heads $TEL_1$-$TEL_8$ are firmly attached to a movable carriage CHAR via a head suspension assembly EST. The carriage and the heads are displaced radially with respect to the disks $DISC_1$-$DISC_4$ along a predetermined linear path. The carriage CHAR is in turn mechanically attached to the movable coil BOB of a linear electrodynamic motor ML of the "voice coil" type, which includes a permanent magnet AM on the inside of which it is displaced. It is magnetized by a current I, the form of which will be explained hereinafter with reference to FIG. 4.

Thus it is seen that the movable system SYSMOB in fact comprises the coil BOB, the carriage CHAR, the head suspension assembly EST and the heads $TEL_1$-$TEL_8$.

Equation of movement of the movable system

For better understanding of the function of the apparatus for performing the method of displacing the system SYSMOB which is movable with respect to the magnetic disk $DISC_1$-$DISC_4$, according to the invention, the equation of movement of this movable system must be worked out. The position x(t) and speed v(t) of the system along the predetermined path are measured.

The coil BOB comprises a plurality of turns, of which a length l of wire is subjected to the induction B created by the permanent magnet AM. It is supplied with a current i(t) as a function of time.

The passage of the current i(t) through the coil develops a force F applied to the movable system, this force being as follows:

$$F(t) = B \times l \times i(t) = K_0 \times i(t) \tag{1}$$

where $$K_0 = l \times l \tag{2}$$

If the external forces acting upon the carriage are represented by the symbol f, such as the mechanicl strain of the wires carrying the current i(t) to the coil BOB and the inclination of the movable system, are represented by the symbol f, and the symbol $f_1(t)$ designates the forces of boundary friction, where $$f_1(t) = f_0 \times \text{sign}(v(t)) \tag{3}$$

where $f_0$ is the module of the force, the mechanical equation of movement can be written as follows:

$$F(t) = M \times \gamma(t) + f + f_1(t) \tag{4}$$

where $\gamma(t)$ represents acceleration.

If $$f_2 = f_0 + f_1 \tag{5}$$

then from this it is deduced that $$i(t) = \frac{M}{K_0} \cdot \frac{dv}{dt} + \frac{f_2}{K_0} = \frac{M}{K_0} \cdot \frac{d^2x}{dt^2} + \frac{f_2}{K_0} \tag{6}$$

Assuming $$\frac{d^2x}{dt^2} = \dot{x}_2 \tag{7}$$

and $$\frac{dx}{dt} = \dot{x}_1 \tag{8}$$

with $x(t) = x_1$.

The movement controlled by equation (6) is of the second order, and there are accordingly two state variables, that is, $\dot{x}_2$ and $\dot{x}_1$, respectively representing the acceleration and the speed of the system.

If the equation of movement is written in the form of a representation of a state, the following equation is obtained:

$$\begin{bmatrix} \dot{x}_1 \\ \dot{x}_2 \end{bmatrix} = \begin{bmatrix} 0 & 1 \\ 0 & 0 \end{bmatrix} \begin{bmatrix} x_1 \\ x_2 \end{bmatrix} + \begin{bmatrix} 0 & 0 \\ \frac{K_0}{M} & \frac{-1}{M} \end{bmatrix} \begin{bmatrix} i \\ f_2 \end{bmatrix} \tag{9}$$

In practice, the force $f_2$ is negligible, and in vector form the equation (9) becomes $$\begin{cases} \underline{\dot{X}} = AX + Bi \\ x = C^T X \end{cases} \tag{10}$$

with $A = \begin{bmatrix} 0 & 1 \\ 0 & 0 \end{bmatrix}$; $B = \begin{bmatrix} 0 \\ \frac{K_0}{M} \end{bmatrix}$; $C^T = [1\ 0]$ $$\underline{X} = \begin{bmatrix} x_1 \\ x_2 \end{bmatrix}$$

$$\underline{\dot{X}} = \begin{bmatrix} \dot{x}_1 \\ \dot{x}_2 \end{bmatrix}$$

The quantities $\underline{\dot{X}}$ and $\underline{X}$ are vectors.

The motor is supplied with a current $i(t)$. Generally this current is furnished by a control amplifier of the voltage/current converter type, having a gain of $\alpha$. If this amplifier is supplied at a voltage $u(t)$, then:

$$i(t) = \alpha u(t)$$

and equation (10) can then be written as follows:

$$\underline{\dot{X}} = A\underline{X} + B\alpha u(t) \tag{11}$$

It is known that the general solution of a differential equation of this kind is written in the following form:

$$\underline{X}(t) = e^{A(t-t_0)} \cdot \underline{X}(t_0) + \int_{t_0}^{t} e^{A(t-\tau)} \cdot B\alpha u(\tau) \cdot d\tau \tag{12}$$

To make all the reasoning relating to the movement of the movable system simpler, suppose that it is desired to read the data on only one side of one of the disks DISC$_1$-DISC$_4$ (which corresponds to what is effectively produced in current practice), for example the side associated with the head TEL$_1$. Only the head TEL$_1$ is in action; the other reading/writing heads TEL$_2$-TEL$_8$ are thus inactive.

Thus as explained above, the position of the head (that is, the address read by the head) is known only every T seconds. The position of the head TEL is thus known only discretely, that is, at the instants 0, T, 2T, ..., kT, (K+1)T, etc. $\underline{X}(k+1)T$ and $\underline{X}(kT)$ designate the value of the state vectors $\underline{X}$ at the instants (k+1)T and kT.

The solution of equation (12) is generally written as:

$$\underline{X}(k+1)T = \underline{\phi}\underline{X}(kT) + \underline{\theta}u(kT) \tag{13}$$

and can be more simply written as:

$$\underline{X}(k+1) = \underline{\phi} \cdot \underline{X}(k) + \underline{\theta}u(k) \tag{14}$$

where:

$$\underline{\phi} = e^{AT} = I + AT + \frac{A^2T^2}{2} + \ldots + \frac{A^nT^n}{n!} + \ldots \tag{15}$$

and $$\underline{\theta} = \alpha T \cdot \left[ I + \frac{AT}{2!} + \frac{A^2T^2}{3!} + \ldots + \frac{A^nT^n}{(n+1)!} + \ldots \right] \times B \tag{16}$$

The process (that is, the movement of the movable system SYSMOB that is governed by the state equation (11)) continues as follows:

$$\underline{\dot{X}}(t) = A\underline{X}(t) + B\alpha u(t)$$

with $$x(t) = C^T\underline{X}(t)$$

with the following as its discrete equation:

$$\begin{cases} \underline{X}(k+1) = \underline{\phi}\underline{X}(k) + \underline{\theta}u(k) \\ \underline{S}(k) = G \cdot \underline{X}(k) \end{cases} \tag{14b}$$

with $\underline{S}(k) = \begin{bmatrix} x_1(kT) \\ x_2(kT) \end{bmatrix}$ more simply written as $\begin{bmatrix} x_1(k) \\ x_2(k) \end{bmatrix}$ In the present application, the head position TEL$_1$ $x(k)$ coincides with the state variable $x_1(k)$; hence $$G = \begin{bmatrix} 1 & 0 \\ 0 & 0 \end{bmatrix} \tag{14c}$$

If in calculating $\underline{\phi}$ and $\underline{\theta}$, a limitation to the development of the first order is made, the result is:

$$\underline{\phi} = I + AT = \begin{bmatrix} 1 & 0 \\ 0 & 1 \end{bmatrix} + \begin{bmatrix} 0 & 1 \\ 0 & 0 \end{bmatrix} \times T$$

$$\underline{\phi} = \begin{bmatrix} 1 & T \\ 0 & 1 \end{bmatrix} \tag{10b}$$

and

-continued $$\underline{\theta} = aT \cdot \left[ I + \frac{AT}{2!} \right] \cdot B$$

$$= aT \times \left[ \begin{bmatrix} 1 & 0 \\ 0 & 1 \end{bmatrix} + \begin{bmatrix} 0 & T/2 \\ 0 & 0 \end{bmatrix} \right] \times B$$

$$= aT \begin{bmatrix} 1 & T/2 \\ 0 & 1 \end{bmatrix} \times \begin{bmatrix} 0 \\ K_0/M \end{bmatrix}$$

$$\underline{\theta} = \begin{bmatrix} aT^2 K_0/2M \\ aTK_0/M \end{bmatrix} \quad (10c)$$

Figure 3:
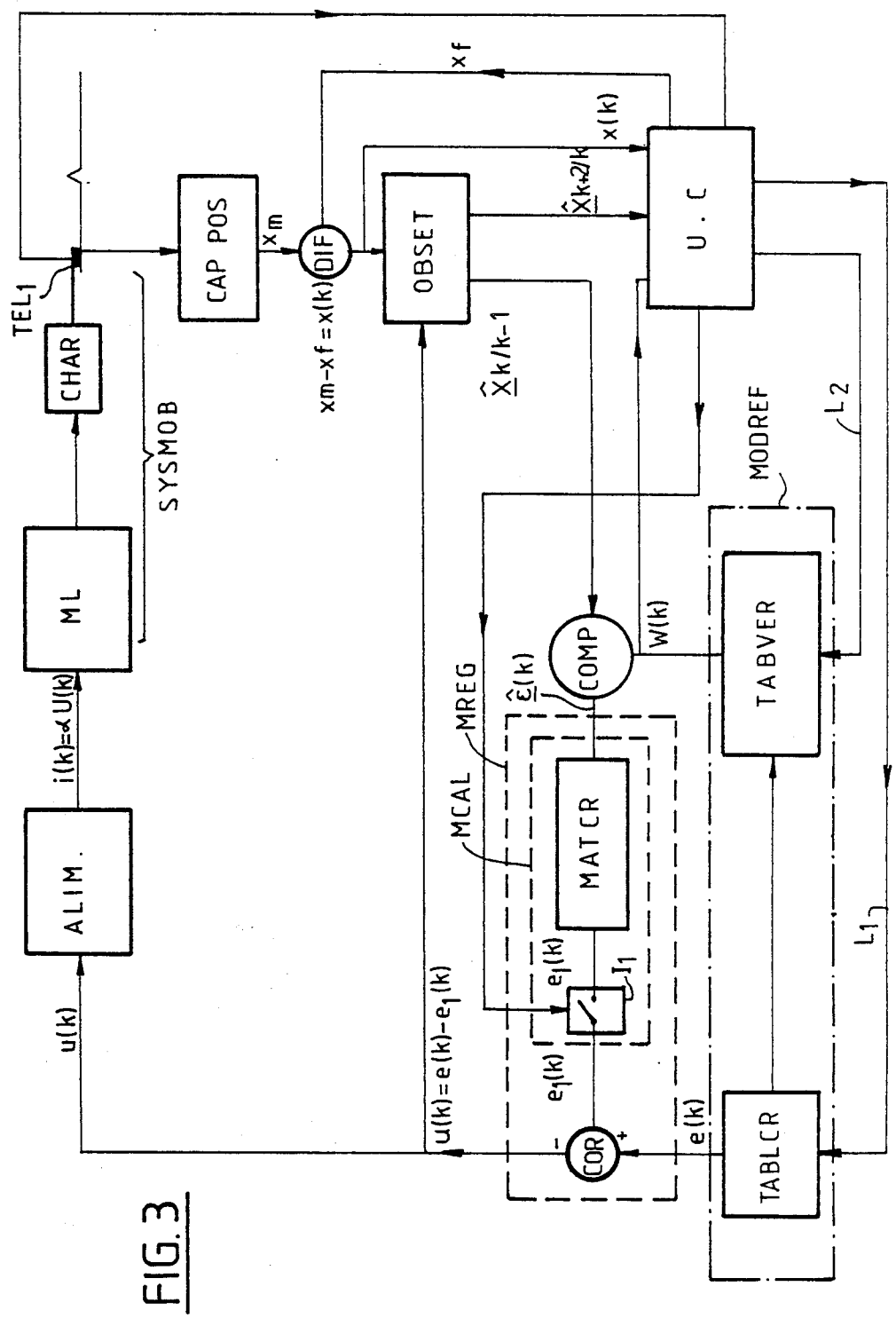
FIG. 3 is a simplified block diagram of the apparatus for displacement of a system that is movable with respect to a data carrier such as a magnetic disk, for performing the method according to the invention.

Constituent elements of the apparatus for displacing the movable system SYSMOB, according to the invention FIG. 3 shows the various essential constituent elements of the apparatus for performing the method according to the invention. These elements are as follows:

the linear electrodynamic motor ML, the movable system SYSMOB being constituted as described above in connection with FIG. 2;

the generator ALIM which supplies current i(k) to the coil BOB of the motor ML, controlled by the control voltage u(k), where $i(k) = \alpha u(k)$;

the position pickup CAPPOS, which determines the position $x_m$ of the head TEL$_1$ facing the side of the disk with which it is associated, for each sampling instant kT;

the subtractor DIF, which receives the position $x_m$ of the head TEL$_1$ measured by the pickup CAPPOS and the position of the arrival track B, that is, $x_f$, and finds the difference $x_m - x_f$, which it sets equal to x(k);

the reference memory MODREF, which contains, first, a value e(k) of a reference control voltage, and, second, a reference state vector $\overline{W}(k)$, for each sampling instant kT. The components of the vector $\overline{W}(k)$ are $w_1(k)$, which is the reference position, and $w_2(k)$, which is the reference speed, for the same instant kT;

the state observer OBSET, which receives, first, at each sampling instant kT, the position $x(k-1)$ measured at a near constant, and, second, the control voltage $u(k-1)$, and predicts the value of the vector X which the vector will have at the sampling instant $\overline{k}T$, as a function of the position $x(k-1)$ and the control voltage $u(k-1)$ which are measured at the sampling instant $(k-1)T$, this predicted value being designated by $\hat{X}k/k-1$;

the comparator COMP, which performs the comparison between the vectors $\overline{W}(k)$, $\hat{X}k/k-1$ and calculates the difference:

$$\underline{\epsilon}(k) = \overline{W}(k) - \hat{X}k/k-1;$$

the regulating means MREG, which receive the vector $\underline{\epsilon}(k)$ and the reference control voltage e(k) and furnish a control voltage u(k) as a function of e(k) and $\underline{\epsilon}(k)$;

the calculation means MCAL, which receive the vector $\underline{\epsilon}(k)$ and calculate a correction voltage $e_1(k)$ as a function thereof; and a corrector COR which receives the reference control voltage e(k) and the correction voltage $e_1(k)$ and furnishes a control voltage u(k) equal to the difference between e(k) and $e_1(k)$; this control voltage u(k) is sent to the current generator ALIM and to the observer OBSET.

When the head TEL$_1$ is displaced from the departure track A to the arrival track B, the apparatus for displacing the movable system SYSMOB is under automatic control during all or part of the course traversed by the head between the tracks A and B; that is, it then functions in a closed-loop manner.

Method performed by the apparatus according to the invention

The apparatus shown in FIG. 3 thus performs the method according to the invention as follows (for the portion of the course where it is under automatic control):

1. At each predetermined sampling instant kT, a prediction is made by means of the state observer OBSET of the value of the state vector $\hat{X}k/k-1$ that provides the position and speed of the head TEL$_1$ at this same instant kT, beginning at its measured position $x_m$—and consequently as a function of the difference $x_m - x_f = x(k-1)$—and beginning at the control voltage $u(k-1)$, both the measured position and the control voltage being taken at the preceding sampling instant $(k-1)T$;

2. the predicted state vector $\hat{X}k/k-1$ is compared with the reference state vector $\overline{W}(k)$ furnished by the reference memory MODREF, by means of the comparator COMP;

3. the control voltage u(k) of the generator ALIM at the instant kT is calculated by the regulating means MREG, as a function of a reference control voltage e(k) at this same instant kT and of the difference $\underline{\epsilon}(k)$ between the predicted state vector $\hat{X}k/k-1$ and the reference state vector $\overline{W}(k)$ furnished by the comparator COMP. The result is:

$$u(k) = e(k) - e_1(k)$$

with $$e_1(k) = f(\underline{\epsilon}(k)),$$

where $e_1(k)$ is furnished by the calculating means MCAL.

Selected law of current control

Figure 4:
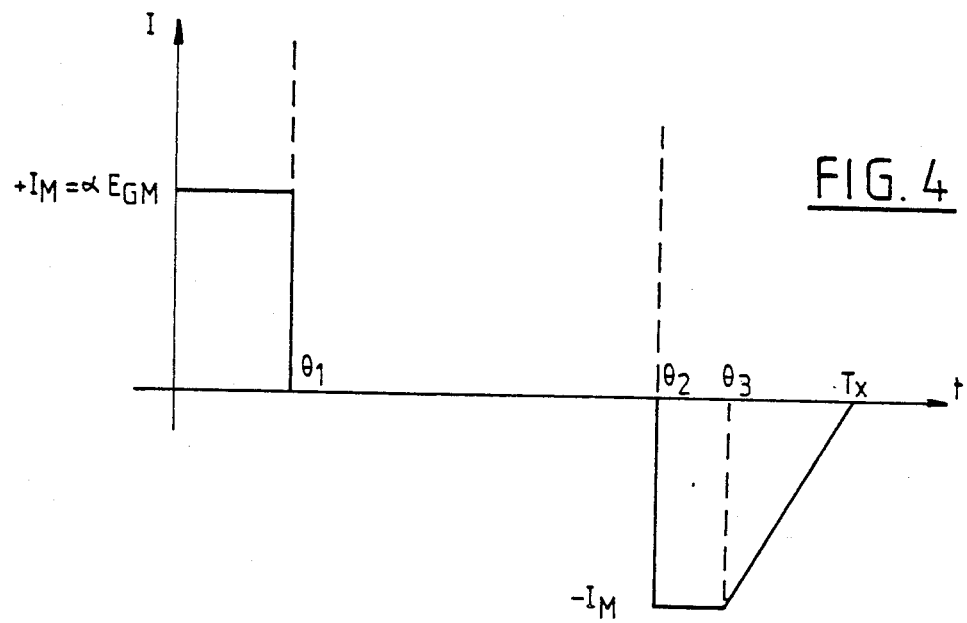
FIG. 4 illustrates the law of current selected as a function of time for supplying current to the movable coil of the linear motor that drives the movable system according to the method of the invention.

In a preferred embodiment of the invention, the selected control law for the supply of current to the electrodynamic motor ML includes three successive phases, as shown in FIG. 4, where the evolution of the current i(k) for supply to the motor is shown as a function of the time t.

During the first phase, up to the instant $\theta_1$, the motor is supplied with a current $I_M$ which is constant and is for example positive.

Between the instants $\theta_1$ and $\theta_2$ (with $\theta_2 > \theta_1$), the current in the motor is zero.

Between the instants $\theta_2$ and $T_X$, where $T_X$ is the instant when the head TEL$_1$ arrives at a zero speed facing the arrival track B, the current is initially constant and negative, equal to $-I_M$ between the instants $\theta_2$ and $\theta_3$, then decreases linearly from the value $-I_M$ to zero between the instants $\theta_3$ and $T_X$.

It will be appreciated that this law of current control enables a substantial reduction in the energy that must be furnished to the system SYSMOB in order to displace it from the track A to the track B within a predetermined time. This law furthermore enables using very simple control circuits. The result is substantial economy in the use and embodiment of the apparatus for displacing the movable system.

The linear decrease in the current between the instants $\theta_3$ and $T_X$ enables the head $TEL_1$ to arrive gently facing the arrival track B, without overshooting it. It will be appreciated that this makes it possible to minimize the correction term $e_1(k)$; that is, the voltage $u(k)$ can more closely follow the reference control voltage $e(k)$.

It will be apparent that the law of control of the reference voltage is identical to the law of control of the reference current shown in FIG. 4; all that need be done is to replace $I_M$ or $-I_M$ with $\pm E_{GM}$, where $E_{GM}$ is such that $$I_M = \alpha \times E_{GM}.$$

Law of movement of the movable system, corresponding to the law of the current

Figure 5A:
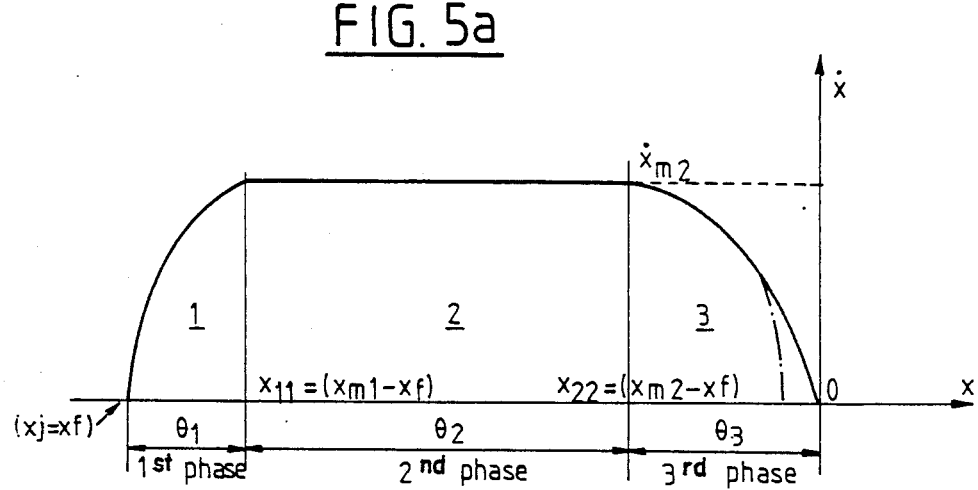
FIGS. 5A–5B illustrate two curves showing the speed of the movable system as a function of the distance, this curve resulting from the application of the law of supplying current to the motor as a function of time as illustrated in FIG. 4.

As a function of the law of current control represented in FIG. 4, the movement of the movable system SYSMOB has the following evolution, shown in FIG. 5a, in the phase diagram giving the speed $\dot{x}$ as a function of the position x (where $x = x_m - x_f$).

During the first movement phase, between the instants $t_0(k=0)$ and $\theta_1$, the speed $\dot{x}$ evolves as a function of the position x in accordance with a parabolic curve, until the head $TEL_1$ reaches a position $x11 = (xm1 - xf)$. During this first phase, the acceleration of the movable system is constant.

During the second phase, between the instants $\theta_1$ and $\theta_2$, the movable system is displaced at a substantially constant speed (in fact, the speed loss due to friction is considered negligible) between the positions x11 and x22 (=xm2−xf).

During the third phase, the speed decreases in a substantially parabolic manner between the position x22 and the position x=0. This phase is the deceleration phase.

In a preferred exemplary embodiment of the invention, the apparatus for displacement of the movable system functions in an open loop during the first two phases and is slaved, or under automatic control, during the deceleration phase.

It will be apparent that to reduce the energy expended by the apparatus for displacing the movable system, at the time of the transit between the tracks A and B, (xm1−xmf) must be equal to 0.825 (xd−xf), where xd is the position of the departure track A.

The various phases of movement are thus controlled by a control unit UC, which is connected respectively to the means MCAL, the memory MODREF and the subtractor DIF and operates in the following manner.

This control unit is connected to the head $TEL_1$, via a forming circuit, and receives one pulse per sampling instant kT. At the instant $t_0$, that is, when k=0, the position x(k) is equal to $x_d - x_f$. The control unit UC then gives the order to the memory MODREF to furnish a reference voltage $e_k$, which is equal to $E_{GM}$, to the corrector COR. Then the control unit prohibits the means MCAL from furnishing a correction voltage $e_1(k)$ since the displacement apparatus must not be slaved during the first two phases. To this end, a circuit breaker $I_1$ is disposed inside the means MCAL, to inhibit the functioning of these means during the first two phases. The circuit breaker $I_1$ is thus opened until the instant $\theta_2$.

Beginning at the moment when the displacement apparatus is set in motion, the control unit UC, which contains the value of $x_f$, sends it to the subtractor DIF, which calculates the quantity x(k). This quantity is compared in absolute value by the control unit with $0.825 \times (x_d - x_f)$. When x(k) is equal to this latter quantity, the control unit then gives the order to the memory MODREF to cancel the reference control voltage. The supply current in the coil of the motor is then zero. The second phase of movement begins, lasting until the control unit gives the order to shift to the deceleration phase, when the point having the position x22 is reached. The manner in which the shift is made to the deceleration phase by detecting the position x22 and the corresponding speed $\dot{x}22$ will be described later herein, in connection with the description of how the reference vector $\overline{W}(k)$ is calculated and referring to FIGS. 7a and 7b. Beginning at the instant $\theta_2$, the control unit UC gives the order to the reference memory MODREF to furnish the corrector COR with a reference control voltage:

$$e(k) = -E_{GM}$$

between the instants $\theta_2$ and $\theta_3$, then decreasing linearly until the instant $T_X$, where the reference control voltage becomes zero.

During the third movement phase, beginning at the instant $\theta_2$, the apparatus according to the invention for displacing the movable system functions in a closed loop, that is, it is slaved, and the control unit UC closes the circuit breaker $I_1$ in such a manner that the control voltage u(k) furnished to the current generator ALIM is equal to $e(k) - e_1(k)$.

The third phase, which is the final phase in the movement of the movable system, is the most delicate, because it must put the head $TEL_1$ facing the arrival track B, in accordance with the control law shown in FIG. 4 and in such a manner that when the head is located facing the track B, $\dot{x}(k) = 0$, $x(k) = 0$, and $u(k) = 0$.

To be certain that the final conditions described above are met, the reference model, that is, the set of vectors $\overline{W}(k)$ for each value of k, is calculated by counting the time upward again beginning at the final instant, that is, the instant where the head $TEL_1$ is located facing the arrival track B.

The calculation of the reference model is performed with time differentiation, for example by computer, and all the values of $\overline{W}(k)$ for each value of k are recorded in a memory table of the memory MODREF, that is, the table TABVER. Moreover, the set of values e(k) that give the reference control voltage for each value of k is contained in a table TABLCR, which is also part of MODREF. The tables TABLCR and TABVER are each connected to the control unit U.C via the connections L1 and L2. During the three movement phases, the control unit gives the order to the table TABLCR to transmit the values of e(k) to the corrector COR, by way of the connection L1.

It has been seen above that the movement of the movable system is governed by the state equation (14).

Calculation of the reference state vector

The reference model which is selected must be governed by a state equation analogous to that of the real movement of the movable system, such that the corrective action by the corrector COR will be as slight as possible; that is, the term $e_1(k)$ should be as small as possible. In other words, the reference model selected must be as close as possible to the natural evolution of the movable system SYSMOB.

Accordingly, this reference model is such that $$\underline{W}(k+1) = \phi \cdot \underline{W}(k) + \underline{\theta} e(k) \tag{17}$$

The matrices $\phi$ and $\theta$ are identical to the matrices mentioned above in equations (10b) and (10c).

The law providing the evolution of $e(k)$ for each value of k is known; this is the law shown in FIG. 4.

To calculate each of the vectors $\underline{W}(k)$, one begins at the final state vector $\underline{W}(N)$ corresponding to the arrival track B.

It is necessary for $$\underline{W}(N) = 0 \text{ ete}(N) = 0$$

$$\underline{W}(N) = \phi \underline{W}(N-1) + \underline{\theta} e(N-1)$$

hence $$\underline{W}(N-1) = \phi^{-1} \cdot \underline{W}(N) - \phi^{-1} \cdot \underline{\theta} \cdot e(N-1),$$

$\phi^{-1}$ being the inverse matrix of $\phi$.

With $\underline{W}(N) = 0$ known and with $(M-1)$ satisfying the law of control of FIG. 4, $W(N-1)$ is deduced.

Repeating the calculation in an identical manner, the result is:

$$\underline{W}(N-i) = \phi^{-1}[\underline{W}(N-i+1) - \underline{\theta} e(N-i)]$$

Figure 5B:
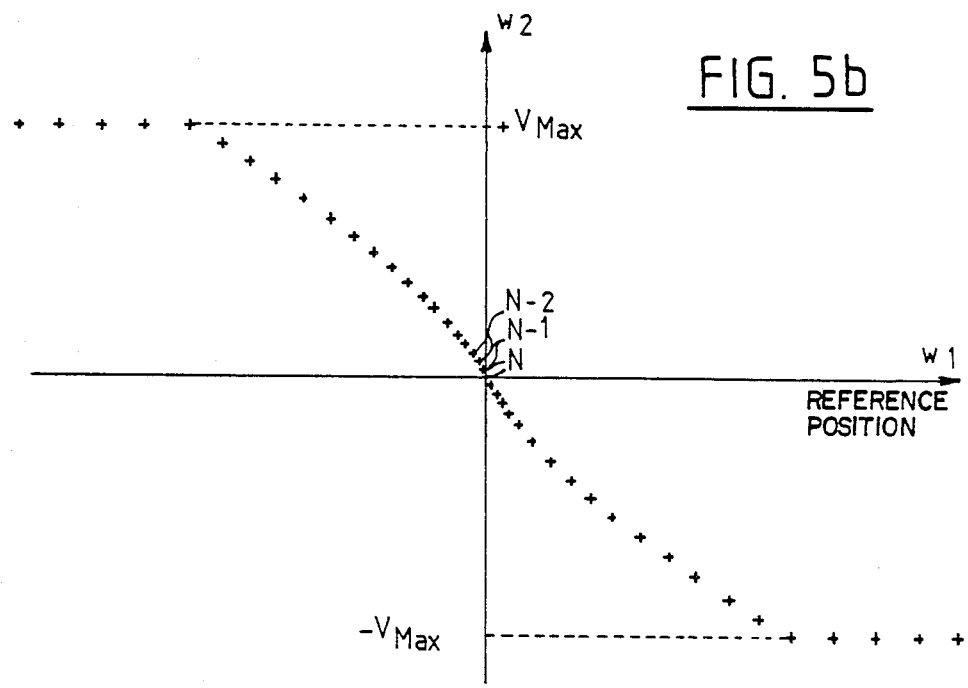

The evolution in the phase diagram of the reference model (which is discrete, since it comprises a train of discrete values for each value of k), that is, the curve providing the variation of the reference speed $w_2$ as a function of the reference position $w_1$, is shown in FIG. 5b. The values of $w_1$ are positive or negative, since the reference model is symmetrical with respect to the origin. Accordingly, all that is memorized in the table TABVER is one-half of the reference model. It will be seen that the reference model is made of a succession of discrete points and that the value of $w_2$ is included between a value $V_{Max}$ and a value $-V_{Max}$, the curve connecting these points passing through the origin, at which there is an inflection point.

Thus the reference model comprises a table of N vectors $\underline{W}(n)$ and their associated control voltage $e(n)$; this table contains as many reference vectors as necessary to attain a maximum speed $\dot{x}$ equal to $V_{Max}$, which corresponds to the speed attained for the longest possible course between tracks A and B. This table is subscripted with $n=0$ at the origin (with $x=0$ and $\dot{x}=0$) up to $n=N_1$, where $N_1$ is the minimum number of samples, that is, of discrete values, calculated in inverse time (that is, in counting the time backward, beginning at the origin which corresponds to the arrival point), required for reaching the maximum speed $V_{Max}$. If the table of vectors $\underline{W}(n)$ which is memorized in the table TABVER is given for the negative values of $w_1(n)$ (which corresponds to $x_d < x_m < x_f$, that is, when displacement is made to an arrival track B the serial number of which is greater than the serial number of the departure track A), the result is the table corresponding to the positive values of x, by symmetry with the first table. This is illustrated by FIG. 5b, which shows all the points representing vectors $\underline{W}(k)$, for positive or negative values of $w_1$.

Turning now to FIG. 6: FIGS. 6a, 6b, 6c, respectively, represent the evolution of the reference control voltage and consequently of the corresponding reference control current, FIG. 6b represents the evolution of the reference speed $w_2(k)$ as a function of time, and FIG. 6c represents the evolution of the reference position $w_1(k)$ as a function of time.

The curve $\Gamma_1$, which represents the evolution of the reference control voltage and hence the reference current, since $\alpha e(k) = i(k)$ thus varies between a minimum value $(-I_M = -\alpha E_{GM})$ and a zero value, decreasing linearly from this minimum value to this zero value beginning at the instant $\theta_3$. It is clear that the curve $\Gamma_1$ of FIG. 6a is identical to that shown in FIG. 4.

The curve $\Gamma_2$ which represents the evolution of the reference speed as a function of the time t is a decreasing curve that passes through the origin and is tangent to the time axis in the vicinity of the origin.

The curve $\Gamma_3$ which represents the evolution of the reference position as a function of the time t is an increasing curve, from markedly negative values to the value of zero corresponding to the origin. The curve $\Gamma_3$ is tangent to the time axis in the vicinity of the origin.

Thus, as has been noted earlier herein, the movement of the movable system is slaved only during the deceleration phase, beginning at the instant $\theta_2$. For this reason, the reference model has been shown in FIGS. 6a, 6b and 6c only for this last phase, since the values of the vectors $\underline{W}(n)$ are given only for this last phase in the table TABVER.

In FIG. 6, the values for the reference speed and reference position are shown, calculated for two different values for the instant $\theta_2$, that is, the value $\theta_2$ proper and the value $\theta'_2$, to which the values $V_0$ and $V'_0$ of the reference speed and x22 and x'22 of the reference position correspond.

The shift to the deceleration phase

Figure 7A:
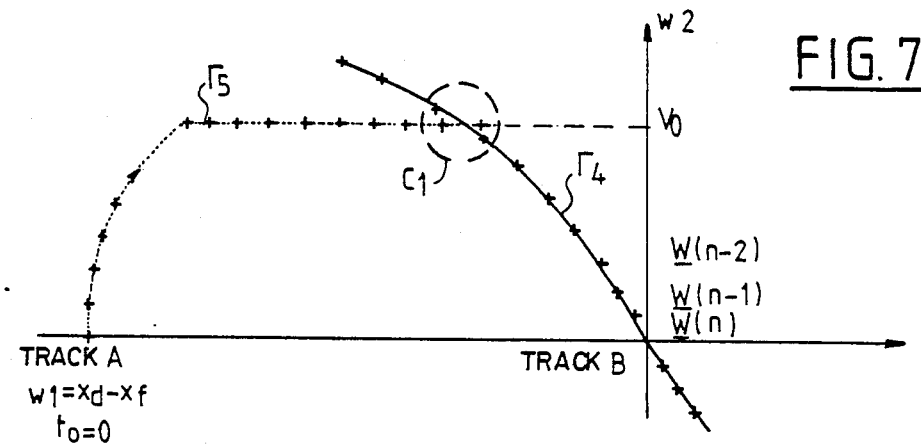
Figure 7B:
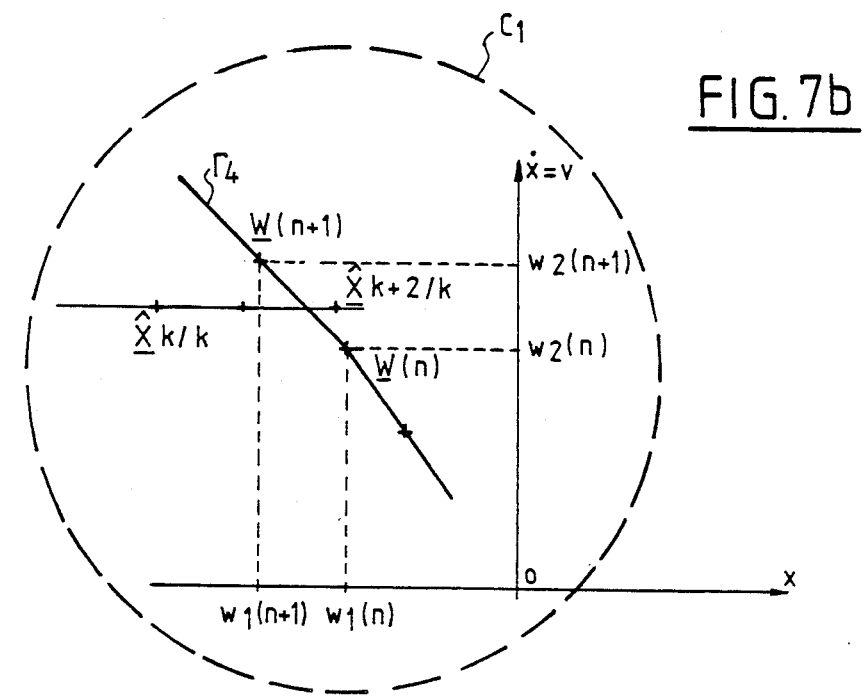

FIGS. 7a and 7b will enable better understanding of how the shift to the deceleration phase is detected, that is, how the speed and position of the movable system SYSMOB corresponding to the instant $\theta_2$ are determined.

See FIG. 7a. Shown in this same figure is the curve $\Gamma_5$, which connects the various points in the phase diagram representing the estimated speed and position of the head $TEL_1$, that is, the two components of the vector $\hat{X}_{k/k}$, calculated by the state observer OBSET (in the manner described below in the detailed description of the observer OBSET, referring to FIG. 8a), for each instant kT between the instant $t_0 = 0$, where the head $TEL_1$ is facing the track A, and the instant where it arrives facing the track B. It is understood that this curve $\Gamma_5$ is identical to the curve shown in FIG. 5.

This curve $\Gamma_5$ intersects the broken line $\Gamma_4$ connecting all the point of the reference model in this same phase diagram, inside the circle $C_1$.

This circle $C_1$ is shown on a larger scale in FIG. 7b.

Let it be assumed that the movable system has attained its plateau speed $V_0$. Since the calculated state vector of the movable system is known, that is, $\hat{X}_{k/k}$, the value which the state vector will attain can be predicted, that is, $\hat{X}_{k+m/k}$, without changing the control (that is, $i(k)$ remains zero), at the instant $t = kT + mT$, where m is an integer greater than 1. This enables the shift to the deceleration phase to be detected soon enough, and thus makes it possible to follow the reference model with improved precision. It has been found, after computer simulation, that the value m=2 is sufficient for precise detection of the change of phase.

Thus, $$\hat{\underline{X}}k + 2/k = \phi_1 \cdot \hat{\underline{X}}k/k + \underline{\theta}_1 \cdot u(k) \tag{18}$$

$$\text{with } \phi_1 = \begin{bmatrix} 1 & 2T \\ 0 & 1 \end{bmatrix} et\ \underline{\theta}_1 = \begin{bmatrix} 2 & C_m T^2 \\ 2 & C_m T \end{bmatrix} \tag{19}$$

$\phi$ and $\theta_1$ are obtained by setting T=2T in $\phi$ and $\theta$, the matrices obtained for the equations (10b) and (10c).

Returning to FIG. 7b, if the representative points of the vectors $\hat{\underline{X}}k+2/k$ and $\hat{\underline{X}}k/k$ are located on both sides of the curve $\Gamma_4$, the system SYSMOB is shifting to the deceleration phase. This shift is controlled by the control unit UC. To do so, the control unit UC receives the predicted state vector $\hat{\underline{X}}k+2/k$ and the reference state vector $\underline{W}(k)$ and compares them.

When n is the subscript of the reference vector in the table TABVER, the comparison done by the control unit makes it possible to verify that $$|W_1(n)| \leq |\hat{x}_1 k + 2/k| \leq |W_1(n+1)|$$
$$\text{Then, if } |W_2(n)| \leq |\hat{x}_2 k + 2/k|$$

the points $\hat{\underline{X}}k+2/k$ and $\hat{\underline{X}}k/k$ are considered to be on both sides of $\Gamma_4$.

The shift to the deceleration phase can then be made. The control unit UC then closes the circuit breaker $I_1$ and gives the order to the table TABVER to furnish the vectors $\underline{W}(k)$ to the comparator COMP, by way of the connection L2.

Figure 8B:
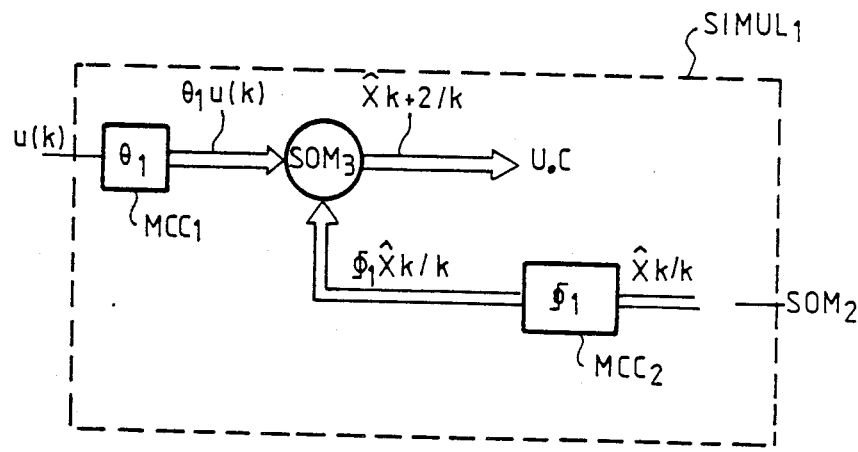
FIGS. 8a and 8b are a more detailed views of the block diagram of FIG. 3, in which each of the elements of FIG. 3 is broken down into a plurality of functional blocks.
Figure 8A:
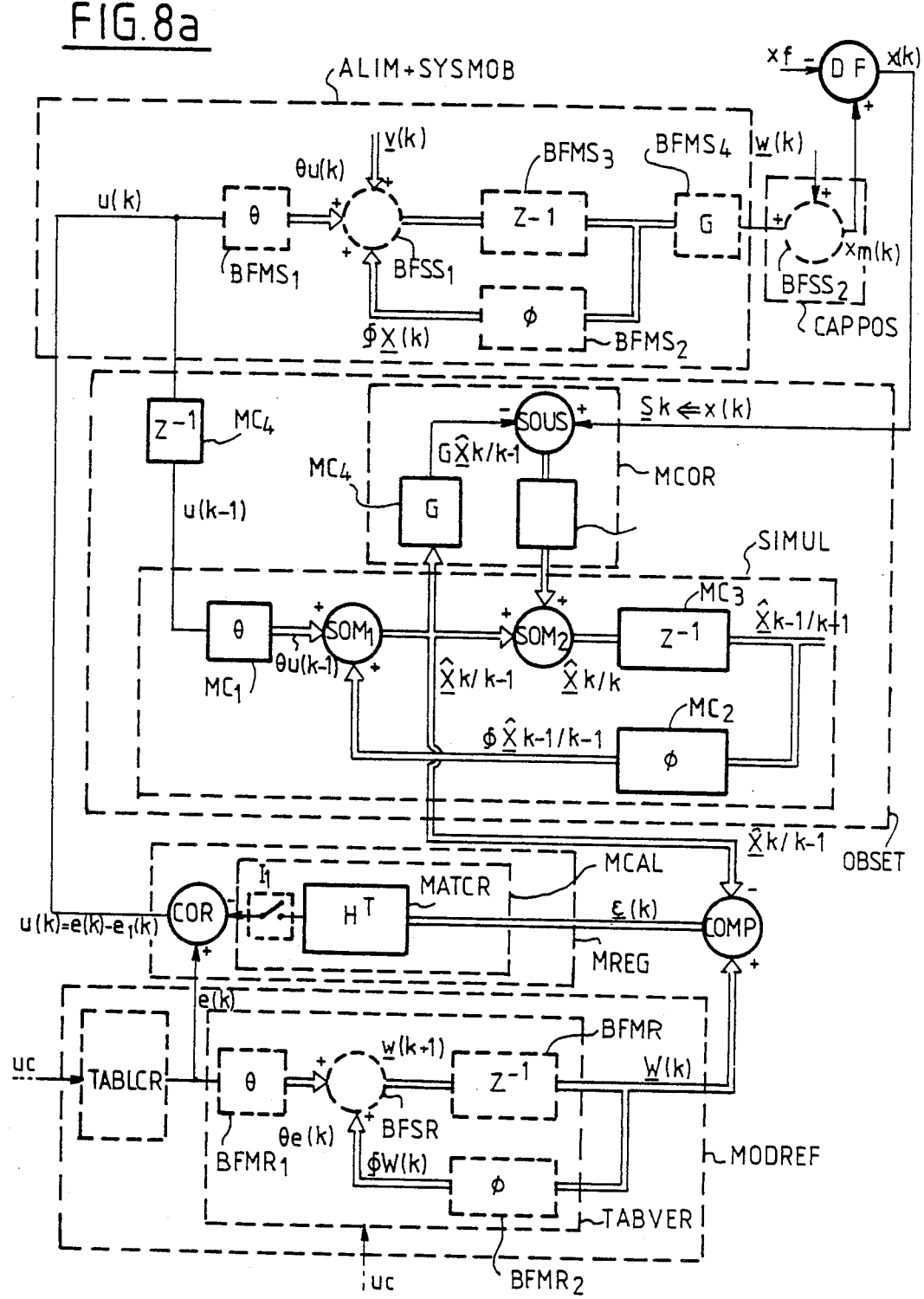

Turning now to FIG. 8a, here various elements shown in FIG. 3 are shown in greater detail, specifically the table TABVER, the movable system SYSMOB, the state observer OBSET and the calculation means MCAL.

The structure and function of the state observer OBSET will be better understood after a description is first provided for the equivalent function diagrams for the table TABVER and for the movable system SYSMOB associated with the current generator ALIM. The analogies between the structure of the state observer and the functional diagrams of TABVER and SYSMOB will then be better understood.

In this same FIG. 8a, the table TABVER which memorizes the reference vectors $\underline{W}(k)$ has been represented by its equivalent functional diagram, which represents the equation (17), in the form of a set of function blocks.

Similarly, the apparatus comprising the current generator ALIM and the movable system SYSMOB has been represented in FIG. 8a by its equivalent function diagram, which represents equations (14) and (14b), in the form of a set of function blocks.

Representation of TABVER and ALIM+SYSMOB, in the form of an equivalent function diagram The table TABVER is thus equivalent to the set of the following function blocks:

the matrix function block BFMR$_1$, which is the column matrix of the equation (10c);

the matrix function block BFMR$_2$, which is the square matrix of the equation (10b);

the adder function block BFSR$_1$, the function block BFMR$_3$, representing a sampling lag of one period T, symbolized by Z−1.

The equivalent function diagram for the generator ALIM and the movable system SYSMOB includes the following function blocks:

the matrix function block BFMS$_1$, which is a column matrix of the equation (10c), and consequently is analogous to the function block BFMR$_1$;

the matrix function block BFMS$_2$, which is the square matrix of the equation (10b), and consequently is analogous to the function flock BFMR$_2$;

the adder function block BFSS$_1$, the function block BFMS$_3$, representing a sampling lag of one period T symbolized by Z−1;

the matrix function block BFMS$_4$, which is the matrix of the equation (14c); and the adder function block BFSS$_2$.

The function blocks comprising the two equivalent function diagrams in the table TABVER, on the one hand, and for the group ALIM-SYSMOB-CAPPOS, on the other, are represented by broken lines in FIG. 8, so as to better show that the representation is symbolic, rather than relating to actual concrete elements such as calculation networks or logic circuits.

The function block BFMR$_1$ receives the control voltage e(k) and calculates the quantity e(k) that is sent to the adder function block BFSR$_1$, which also receives the quantity $\underline{W}(k)$ calculated by the function block BFMR$_2$ which receives the vector $\underline{W}(k)$.

The adder function block BFSR$_1$ then performs the following addition:

$$\theta \underline{e}(k) + \phi \underline{W}(k) = \underline{W}(k+1)$$

At the output of the equivalent function block for the table TABVER, that is, at the output of the function block BFMR$_3$, the vector $\underline{W}(k)$ is thus collected.

Similarly, turning to the equivalent function block for the generator ALIM-SYSMOB-CAPPOS, it is apparent that the function block BFMS$_1$, which receives the control voltage u(k), calculates the quantity $\underline{\theta}$u(k), which is sent to the adder function block BFSS$_1$, which also receives the quantity $\phi \cdot \underline{X}(k)$ calculated by the function block BFMS$_2$ which receives the vector $\underline{X}(k)$.

The function block BFMS$_4$ receives the vector X(k) and sends the quantity GX(k) to the adder function block BFSS$_2$.

The group comprising the generator ALIM, the movable system SYSMOB and the position pickup CAPPOS is not perfect:

in fact, the measurements taken by the position pickup CAPPOS have inherent errors (it has been seen above that the precision with which the position of the head TEL$_1$ above the side of the disk with which it is associated is equal to one-half track, and there are errors in the control voltage and hence in the control current);

the movable system is imperfect: friction is variable (which is essentially due to the roughness with which the carriage CHAR rolls on the guide rails), and there is a slight variation in the parameters defining the movable system as a function of its position, since divergences in manufacture result in a divergence in the characteristics and variation in the inductance of the coil.

These imperfections can be likened to noise, known by the following terms:

process noise, associated with the state vector $\underline{X}k$, that is: $\underline{v}(k)$; and measurement noise, associated with the variable G$\underline{X}$(k), that is: $\underline{w}$(k).

The quantities $\underline{v}$(k) and $\underline{w}$(k) are vectors.

Equations (14) and (14b) then become $$\underline{X}(k + 1) = \phi \underline{X}(k) + \underline{\theta} u(k) + \underline{v}(k) \tag{20}$$

$$\underline{S}(k) = G\underline{X}(k) + \underline{w}(k) \tag{21}$$

with $\underline{S}(k) = \begin{bmatrix} x(k) \\ 0 \end{bmatrix}$

From the functional point of view, everything happens as if the vector $\underline{v}$(k) is sent to the adder function block BFSS$_1$ and the vector $\underline{w}$(k) is sent to the adder function block BFSS$_2$.

The adder function block BFSS$_1$ then finds the sum $\phi\underline{X}(k)+\underline{\theta}u(k)+\underline{v}(k)$ and then calculates the vector $\underline{X}(k+1)$.

At the output of the function block BFMS$_3$, the vector X(k) is obtained, sent via the input of the function block BFMS$_4$, the output of which, G$\underline{X}$(k), is sent to the adder BFSS$_2$, which then calculates $\bar{x}_{m(k)}$.

Detailed structure of the state observer OBSET

The state observer OBSET is a filter of the Kalman type, which makes a prediction $\hat{X}_{k/k-1}$ of the state vector $\underline{X}_k$ based on the state vector $\hat{\underline{X}}_{k-1/k-1}$, which by definition is an estimate of the state vector $\underline{X}$ at the instant (k−1)T. Similarly, $\hat{X}_{k/k}$, is an estimate of the state vector $\underline{X}$ at the instant kT, based on measurements peformed at that instant.) It is calculated based on measurements performed at the instant (k−1)T, that is, on the knowledge of the control voltage u(k−1) and of the position $x_m$(k−1). Thus it will be apparent that the only measurements taken into account by the predicted state vector $\hat{X}_{k/k-1}$ are those made at the instant (k−1)T. The state observer OBSET first calculates $\hat{X}_{k-1/k-1}$, based on u(k−1) and x(k−1), and then calculates $\hat{X}_{k/k-1}$ based on $\underline{X}_{k-1/k-1}$.

The Kalman filter OBSET includes the following:

a simulator SIMUL, which simulates the movement of the mobile system SYSMOB between the departure track A and the arrival track B and makes the calculation of the predicted state vector $\hat{\underline{X}}_{k/k-1}$, and sends this predicted state vector to the comparator COMP; and correction means MCOR, which receive the predicted state vector $\hat{X}_{k/k-1}$ and the position x(k) and calculate a correction term which is sent to the simulator for modification of the value of the predicted state vector calculated by the simulator SIMUL.

The manner in which the various elements comprising the simulator SIMUL and the correction means MCOR are determined and calculated is explained in detail in the following two documents:

1. "Commande et régulation par calculateur numérique" [Control and Regulation by Digital Computer] by Foulard, Cendraz and Gentil, Edition Eyrolles, 1978.

2. "Le filtrage et ses applications" [Filtering and Its Applications] by M. Labarere, J. B. Krief and B. Gimonet, Editions Lepoudes, 1978.

The following discussion will be limited to a broad outline of the subject.

The determination of the Kalman filter assumes that the statistical characteristics of the noise $\underline{v}$(k) and $\underline{w}$(k) are known; it is assumed that they are Gaussian with a mean value of zero and thus that the matrices of covariance defined below are such that $$E\{\underline{v}(k) \cdot \underline{v}^T(k)\} = Q \tag{22}$$

$$E\{\underline{w}(k) \cdot \underline{w}^T(k)\} = R \tag{23}$$

It is assumed that the noise is not correlated, which signifies that $\underline{v}$(k) is not dependent on $\underline{w}$(k) and vice versa; that is, $$E\{\underline{v}(k) \cdot \underline{w}^T(k)\} = 0 \tag{24}$$

$$E\{\underline{w}(k) \cdot \underline{v}^T(k)\} = 0 \tag{25}$$

It will be recalled that an expression of the type $$E\{\underline{v}(k) \cdot \underline{v}^T(k)\}$$

is called a matrix of mathematical expectation or a matrix of covariance, and that if $\underline{v}$(k) is a vector having components $v_1, v_2$, that is:

$$\underline{v}(k) = \begin{bmatrix} v_1 \\ v_2 \end{bmatrix}$$

with $v^T(k) = [v_1, v_2]$ then $$E\{v(k), v^T(k)\} = E\left\{ \begin{bmatrix} v_1 \\ v_2 \end{bmatrix} [v_1, v_2] \right\} = E\left\{ \begin{bmatrix} v_1^2 & v_1 v_2 \\ v_1 v_2 & v_2^2 \end{bmatrix} \right\}$$

The manner in which the matrices Q and R are calculated will be described later herein. The determination of the Kalman filter is thus done in a stochastic context. The two documents cited above show that if the noise is Gaussian, the Kalman filter is optimal; that is, of all the state observers, it is the Kalman filter in which the variation due to observation is the least.

If $\hat{X}_{k+1/k}$ is the prediction of the state vector $\underline{X}$ at the instant (k+1)T, based on observations made at the instant kT, and $\hat{X}_{k/k}$ having been defined above, then it is shown in the two documents cited above, relating to the Kalman filter, that this filter satisfies the following equations (26)–(32). The series of equations (26)–(29) is known as filtering equations, and the series of equations (30)–(32) is known as prediction equations. The filtering equations are also known as estimation equations.

The filtering (or estimation) equations are as follows:

$$\hat{\underline{X}}_{k/k} = \hat{\underline{X}}_{k/k-1} + K_k[\underline{S}_k - G \cdot \hat{\underline{X}}_{k/k-1}] \tag{26}$$

with $$K_k = C_{k/k-1} \cdot G^T \cdot D_k^{-1} \tag{27}$$

$$D_k = G \cdot C_{k/k-1} \cdot G^T + R \tag{28}$$

$$C_{k/k} = C_{k/k-1} - K_k \cdot D_k^T \cdot K_k^T \tag{29}$$

The prediction equations are as follows:

$$\hat{\underline{X}}_{k+1/k} = \phi \cdot \hat{\underline{X}}_{k/k} + \underline{\theta} u_k \tag{30}$$

$$\hat{\underline{S}}_{k+1/k} = G \cdot \hat{\underline{X}}_{k+1/k} \tag{31}$$

$$C_{k+1/k} = \phi \cdot C_{k/k} \cdot \phi^T + Q \tag{32}$$

where $C_{k/k}$ is the matrix of covariance of the observation error:

$$C_{k/k} = E\{(X_k - \hat{X}_{k/k}) \cdot (X_k - \hat{X}_{k/k})^T\} \tag{5}$$

and $C_{k+1/k}$ is the matrix of covariance of the error in the predicted state, with $$C_{k+1/k} = E\{(X_{k+1} - \hat{X}_{k+1/k}) \cdot (X_{k+1} - \hat{X}_{k+1/k})^T\} \tag{10}$$

The term $K_k$ is called the Kalman correction gain matrix. It is calculated iteratively with the aid of the formulas (26)=(32) beginning at the moment when the matrices of covariance Q and R are known and when the term $C_{k/k} = C_{0/0}$ is known.

The manner in which the matrices of covariance Q and R and the term $C_{0/0}$ are calculated is explained below.

The matrix of covariance Q is calculated in the following manner.

From the equation (10c), the following is drawn:

$$\underline{\theta} = \begin{bmatrix} T^2 \\ T \end{bmatrix} \times a \frac{K_0}{M} \tag{25}$$

C is set $= a \cdot k_0/M$.

T is known with very good relative precision (on the order of 0.01%). The manufacturing tolerances of the various elements comprising the movable system SYS-MOB are such that the term C varies about a mean value $C_m$.

The number of parameters affecting C is high (there is a plurality of resistances for $a$; $k_0$ depends on the dimensions of the motor ML, the quality of the magnets AM, and the position of the coil BOB; the movable system comprises a great number of parts). It can then be assumed that the distribution of C is standard by Gauss's law, centered on the mean value $C_m$ and having a standard $\sigma$ deviation.

It is seen that 99.5% of the set of machines, which is called the "population of machines", has a coefficient C the values of which are included between $0.8C_m$ and $1.2C_m$.

Because a population of machines equal to 99.5% of the set of machiens corresponding to a standard deviation of $3\sigma$ (this is a known characteristic of a law of Gaussian distribution), then the following can be written:

$$3\sigma \approx 0.2 C_m,$$

which yields $\sigma = 0.2 C_m/3$.

Then when the movable system is manufactured a standard deviation is imposed such that $$\sigma \leq 0.2 C_m/3.$$

$\underline{\theta}$ is set $= \underline{\theta}_m + \underline{\Delta\theta}$, where $\underline{\theta}_m$ is the mean value of $\underline{\theta}$. The equation (14) thus becomes:

$$\underline{X}(k+1) = \phi \underline{X}(k) + \underline{\theta}_m u(k) + \underline{\Delta\theta} \cdot u(k) \tag{33}$$

where $\underline{\Delta\theta} \cdot u(k)$ represents the process noise $\underline{v}(k)$.

This process noise $\underline{v}(k)$ thus depends on the control $u(k)$. The maximum value that the latter can then assume, $U_{max}$, is then considered.

A majorant value of the vector is now available, defining the process noise:

$$\underline{v}(k)_{max} = \underline{\Delta\theta} \cdot U_{max} \tag{34}$$

$$\text{hence } \underline{v}(k)_{max} = \begin{bmatrix} \frac{T^2}{2} \\ T \end{bmatrix} \Delta C \cdot U_{max} \tag{35}$$

with $\Delta C = 0,2 \cdot C_m$

The matrix Q of covariance of the process noise is thus:

$$Q = E\{\underline{v}_k \cdot \underline{v}_k^T\} = \begin{bmatrix} \frac{T^4}{4} & \frac{T^3}{2} \\ \frac{T^3}{2} & T^2 \end{bmatrix} U_{max}^2 \cdot E\{\Delta C^2\}$$

but $E\{\Delta C^2\} = \sigma^2$ by definition.

$$\text{Hence } Q = \begin{bmatrix} \frac{T^4}{4} & \frac{T^3}{2} \\ \frac{T^3}{2} & T^2 \end{bmatrix} U_{max}^2 \cdot \frac{0.04}{9} \cdot C_m^2 \tag{36}$$

The terms T, $U_{max}$, $C_m$ are known and so the matrix Q is also known.

The covariance matrix R of the measurement noise is calculated as follows. The point of departure is the equation (21), which is called the observation equation.

In the displacement apparatus according to the invention, only the position x(k) is measured. Thus the non-zero component of the vector of measurement noise $\underline{w}(k)$ is a scalar, that is, w(k), which represents the measurement noise due to the quantification. It has been noted above that the precision with which the position of the head $TEL_1$ is determined, which can be called the quantification increment $\Delta q$, is equal to the length of one-half track, that is, 1 p/2. This measurement noise due to the quantification has a zero mean value and a uniform statistical distribution over the period $(-\Delta q/2, +\Delta q/2)$. According to Sheppard's formula included in the document entitled "Le filtrage et ses applications" cited above, it is shown that the variance of the quantification noise $\sigma^2$ is equal to $\Delta q^2/12$. This quantity can be likened to the matrix of covariance R. Because $\Delta q$ is known, it is seen that the matrix of covariance of the measurement noise R is also known.

The matrix of covariance of errors in estimation at the initial instant, where kT=0, is by definition:

$$C_{0/0} = E\{(X_{0/0} - \hat{X}_{0/0})(X_{0/0} - \hat{X}_{0/0})^T\} \tag{37}$$

Since each movement of the movable system begins at an initial state where the position $x_d = x_{0/0}$ is known with very good precision, where the speed is zero, the vector $(X_{0/0} - \hat{X}_{0/0})$ can be considered to be zero; hence:

$$C_{0/0} = \begin{bmatrix} 0 & 0 \\ 0 & 0 \end{bmatrix} \tag{38}$$

Knowing the values of Q, R and $C_{0/0}$, the gain of the matrix of Kalman correction $K_k$ can be calculated by the procedure explained above: Assuming k=0, then $$C_{k/k} = C_{0/0} = \begin{bmatrix} 0 & 0 \\ 0 & 0 \end{bmatrix}$$

hence $C_{k+1/k} = C_{1/0} = Q$     (32)

Then, k is assumed to be equal to 1, and so the equation provides the following:

$$C_{2/1} = \phi C_{1/1} \phi^T + Q$$

then equation (29) provides the following:

$$C_{1/1} = C_{1/0} - K_1 D_1^T K_1^T$$

but according to equation (28):

$$D_1 = GC_{1/0}G^T + R = GQG^T + R$$

of which all the elements are known. $D_1$ is thus calculatable, as are $D_1^T$ and $D_1^{-1}$.

Furthermore:

$$K_1 = C_{1/0} G^T D_1^{-1},$$

of which all the elements are nevertheless known, can be calculated, as can $K_1^T$. By including the values of $K_1$, $D_1^T$, $K_1^T$ and $C_{1/0}$ in equation (29), the value of $C_{1/1}$ and consequently $C_{2/1}$ are known.

The calculation may be done in the same manner as for each value of k. It is found that for k on the order of 6 to 8, $K_k$ tends toward a constant limit column matrix K.

Similarly, $C_{k/k}$ tends toward a constant matrix.

In the Kalman state observer OBSET shown in FIG. 8a, of the equations (26) through (32), in practice only the equations (26) and (30) are used, since the matrices $K_k$ and $C_{k/k}$ are constant matrices.

Thus as will be seen in detail below, the various essential constituent elements of the simulator SIMUL and of the correction means MCOR enable the realization of the equations (26) and (30).

The various essential constituent elements of SIMUL are:

a calculation matrix network MC$_1$ providing the matrix $\underline{\theta}$;

a calculation matrix network MC$_2$ providing the matrix $\underline{\phi}$, a calculation matrix network MC$_3$ representing a sampling lag having the period T;

an adding element SOM$_1$; and an adding element SOM$_2$.

The correction means MCOR include the following:

a calculation matrix network MC$_4$ providing the matrix G;

a calculation matrix network MKAL providing the Kalman correction gain matrix having a constant value K;

a subtractor element SOUS$_1$.

The mode of operation of the simulator SIMUL and of the correction means MCOR is as follows.

The matrix network MC$_1$ receives the control voltage u(k−1) and calculates the quantity $\underline{\theta}$u(k−1) which is sent to the adder element SOM$_1$. This element also receives a quantity $\underline{X}_{k-1/k-1}$ sent via the matrix network MC$_2$, which receives the state vector $\underline{X}_{k-1/k-1}$.

The adder element SOM$_1$ then calculates the predicted state vector $\hat{X}_{k/k-1}$, which is equal to:

$$\underline{\phi}\hat{\underline{X}}_{k-1/k-1} + \underline{\theta} \times u(k-1),$$

which corresponds to equation (30). This latter predicted state vector calculated by the adder element SOM$_1$ is sent to the adder element SOM$_2$.

Furthermore, this same predicted state vector $\hat{\underline{X}}_{k/k-1}$ is sent to the matrix network MC$_4$, which calculates the quantity $G\hat{\underline{X}}_{k/k-1}$ and sends it to the subtractor element SOUS$_1$, which also receives the position x(k), that is, the vector $\underline{S}_k$.

This subtractor element SOUS$_1$ makes the calculation of $\underline{S}_k - G\hat{\underline{X}}_{k/k-1}$, and sends this difference to the matrix network MKAL which then calculates the expression $$K\{\underline{S}_k - G\hat{\underline{X}}_{k/k-1}\}.$$

The expression calculated by the matrix network MKAL is sent to the adder element SOM$_2$, at the output of which the estimated state vector is collected:

$$\hat{\underline{X}}_{k/k} = \hat{\underline{X}}_{k/k-1} + K \times \{\underline{S}_k - G\underline{X}_{k/k-1}\}.$$

Thus at the output of the element SOM$_3$, the equation (26) is found, and then at the output of the adder element SOM$_2$, the vector provided by the equation (30) is obtained.

At the output of the matrix network MC$_3$, the vector estimated at the preceding sampling instant is collected, that is, $\hat{\underline{X}}_{k-1/k-1}$.

In view of what has been described above, it will be clear that the Kalman state observer OBSET realizes the equations (26) and (30). To calculate $\hat{\underline{X}}_{k+z/k}$ (with a view to detecting the shift to the deceleration phase by the control unit UC), the observer OBSET includes a second simulator SIMUL$_1$, shown in FIG. 8b, which includes:

a calculation matrix network MCC$_1$ providing the matrix $\underline{\theta}_1$;

a calculation matrix network MCC$_2$ providing the matrix $\underline{\phi}_1(\underline{\theta}_1$ and $\underline{\phi}_1$; see equation (19));

an adder element SOM$_3$.

MCC$_1$ receives u(k) and calculates $\theta_1 u(k)$, which it sends to the adder element SOM$_3$.

This adder element also receives the quantity $\phi_1 \hat{X}_{k/k}$ calculated by MCC$_2$, which receives the quantity $\underline{X}_{k/k}$ sampled at the output of the adder element SOM$_2$. $\hat{\underline{X}}_{k+2/k}$ is sent to the control unit UC.

Description of the calculation means MCAL

The calculation means MCAL comprise a correction matrix MATCR followed in series by the circuit breaker I$_1$.

The correction matrix MATCR is determined in the following manner. The matrix MATCR is selected by minimizing a quadratic function via the error vector $\underline{\epsilon}(k)$ and the control $e_1(k)$, by a calculation performed in the above-cited document "Commande et régulation par calculateur numérique".

Going by this same document, the attempt is made to minimize the following expression:

$$I_N = \sum_{k=1}^{k=N} \{(\underline{\epsilon}_k^T M \underline{\epsilon}(k) + \lambda e_1^2(k)\} \quad (39)$$

where $\underline{\epsilon}$ represents the error state vector between the state of the system and the state of the reference model, that is:

$$\underline{\epsilon} = \underline{W} - \underline{X}$$

where
The relationships:

$$\underline{W}(k+1) = \phi \underline{W}(k) + \underline{\theta} \cdot e(k) \quad (17)$$

and $$\underline{X}(k+1) = \phi \underline{X}(k) + \underline{\theta} \cdot u(k) \quad (14)$$

make it possible to write the following:

$$\underline{\epsilon}(k+1) = \phi \underline{\epsilon}(k) + \underline{\theta} \cdot (e(k) - u(k)) \quad (40)$$

with $e(k) - u(k) = e_1(k)$; $e_1(k)$ represents the actions of correction of control with respect to the reference control.

The choice of a quadratic criterion makes it possible to improve the performance of the apparatus for displacement of the movable system according to the invention by minimizing the quadratic error in orientation of the reference model and by minimizing the actions of correcting the control, that is, the term $e_1(k)$.

The value of the matrix MATCR, which has been designated as $H^T$, is calculated as noted in the above-cited reference, by minimizing the criterion $I_N$, and by taking into account the equation (40), the matrix M being selected as symmetrical and positive.

The matrix $H^T$ thus obtained is a line matrix with a negative cofficient. Thus:

$$e_1(k) = H^T \underline{\epsilon}(k) \quad (41)$$

since $e_1(k) = e(k) - u(k)$.

Replacing $e_1(k)$ with its value, the following equation is obtained:

$$u(k) = e(k) - H^T \cdot \underline{\epsilon}(k) \quad (42).$$

What is claimed is:

1. A method for displacing a system (SYSMOB) that is movable with respect to a carrier (DISC) of data recorded on a plurality of tracks, the system being moved by an electric motor (ML) supplied with voltage/current by a supply generator (ALIM) controlled in turn by a control voltage u(k) and including at least one data reading/writing head TEL1 displaced on a given path from a departure track A to an arrival track B, the position $x_m(k)$ of the head (TEL1) on the path being measured at predetermined sampling instants kT by a position pickup (CAPPOS), comprising (1) at each predetermined sampling instant kT, the value of the state vector $\hat{X}_{k/k-1}$ indicating the position and speed of the head $(x, \dot{x})$ at that instant is predicted, as a function of the measured position $x_m(k-1)$ of the head and of the control voltage $u(k-1)$, which are considered at the preceding sampling instant $(k-1)T$;

(2) the predicted state vector $\hat{X}_{k/k-1}$ is compared with a reference state vector $\underline{W}(k)$ indicating the reference position and speed which the head (TEL1) must have at the predetermined sampling instant kT; and (3) the control voltage u(k) is calculated as a function of a reference control voltage e(k) of the motor at the predetermined sampling instant kT and of the difference $\underline{\epsilon}(k)$ between the predicted state vector $\hat{X}_{k/k-1}$ and the reference state vector $\underline{W}(k)$.

2. A method according to claim 1, characterized in that the prediction of the state vector $\hat{X}_{k/k-1}$ takes into account measurement noise w(k) in the variables observed (position, error in control voltage u(k) and process noise v(k).

3. A method according to one of the claims 1 or 2, characterized in that the control voltage u(k) is equal to the difference between the reference control voltage e(k) and a quantity equal to the product of $\underline{\epsilon}(k)$ and a correction matrix $H^T$.

4. An apparatus for displacing a system that is movable with respect to a carrier of data recorded on a plurality of tracks, the system being moved by an electric motor (ML) supplied with voltage/current by a supply generator (ALIM) controlled in turn by a control voltage u(k) and including at least one data reading/writing head TEL1 displaced on a given path from a departure track A to an arrival track B, the position $x_m(k)$ of the head (TEL1) on the path being measured at predetermined sampling instants (kT) by a position pickup (CAPPOS) comprising:

(a) state observation means (OBSET) for predicting the value of the state vector $\underline{X}_{k/k-1}$ at each predetermined sampling instant kT, which receives both the value of the head position $x_m(k-1)$ measured by the position pickup (CAPPOS) at the preceding sampling instant $(k-1)T$ and the value of the control voltage $u(k-1)$ at this same preceding sampling instant;

(b) means for memorizing a reference control voltage e(k) and a reference state vector $\underline{W}(k)$ for each sampling instant kT;

(c) means (COMP) for comparing the predicted state vector $\underline{X}_{k/k-1}$ with the reference state vector W(k) and for calculating the difference $\underline{\epsilon}(k)$ between them; and (d) regulating means (MREG) calculating the control voltage u(k) as a function of the reference control voltage e(k) and of the difference $\underline{\epsilon}(k)$ between the predicted state vector and the reference state vector.

5. An apparatus according to claim 4, characterized in that the state observation means (OBSET) comprise a Kalman state observer, the Kalman matrix of which is constant.

6. An apparatus according to claim 4 or 5, characterized in that the regulation means (MREG) comprise:

a calculation matrix (MATCR) having the value $H^T$ receiving the difference $\underline{\epsilon}(k)$ between the predicted state vector and the reference state vector and furnishing a correction voltage $e_1(k)$, via a circuit breaker $I_1$; and a corrector (COR) receiving the reference control voltage e(k) sent by the means (MODREF) for memorizing the reference voltage, and which effects the difference between e(k) and $e_1(k)$, where $e_1(k)$ is equal to the product of $H^T$ and $\underline{\epsilon}(k)$.

* * * * *

UNITED STATES PATENT AND TRADEMARK OFFICE
CERTIFICATE OF CORRECTION

PATENT NO. : 4,792,870
DATED : December 20, 1988
INVENTOR(S) : PINSON

It is certified that error appears in the above-identified patent and that said Letters Patent is hereby corrected as shown below:

Claim 2, line 5, after "$\underline{v}(k)$" insert --)--.

Claim 4, line 11, after "means" insert --(MODREF)--.

Signed and Sealed this

First Day of August, 1989

*Attest:*

DONALD J. QUIGG

*Attesting Officer*　　　Commissioner of Patents and Trademarks